United States Patent Office 3,452,542
Patented July 1, 1969

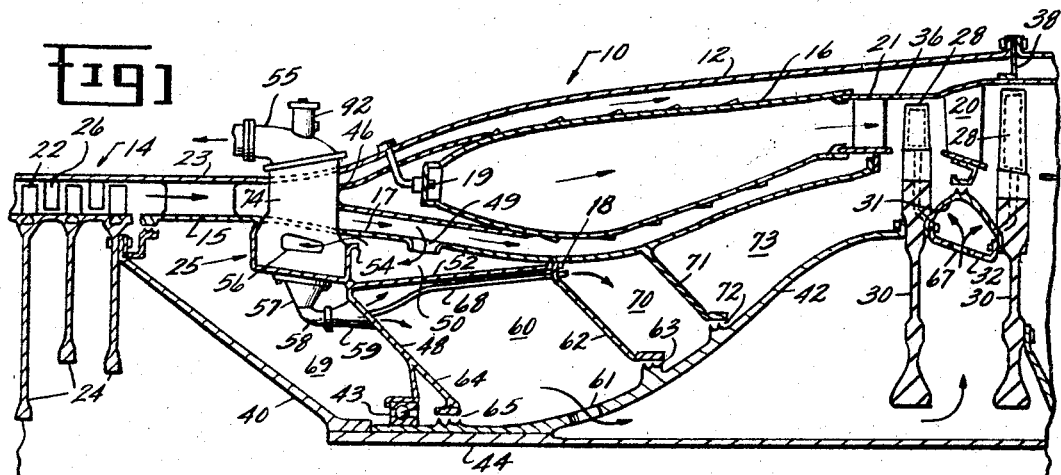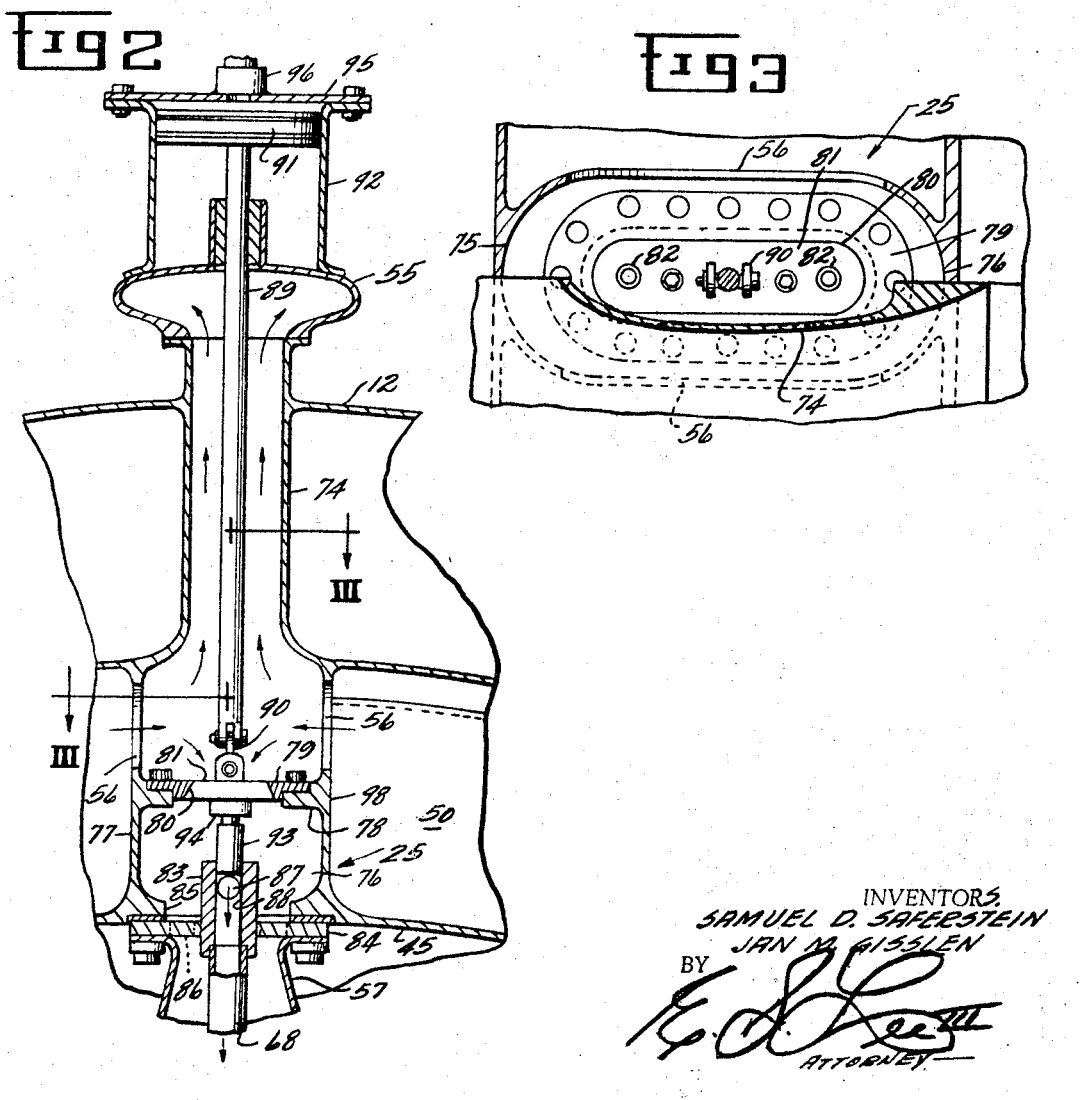

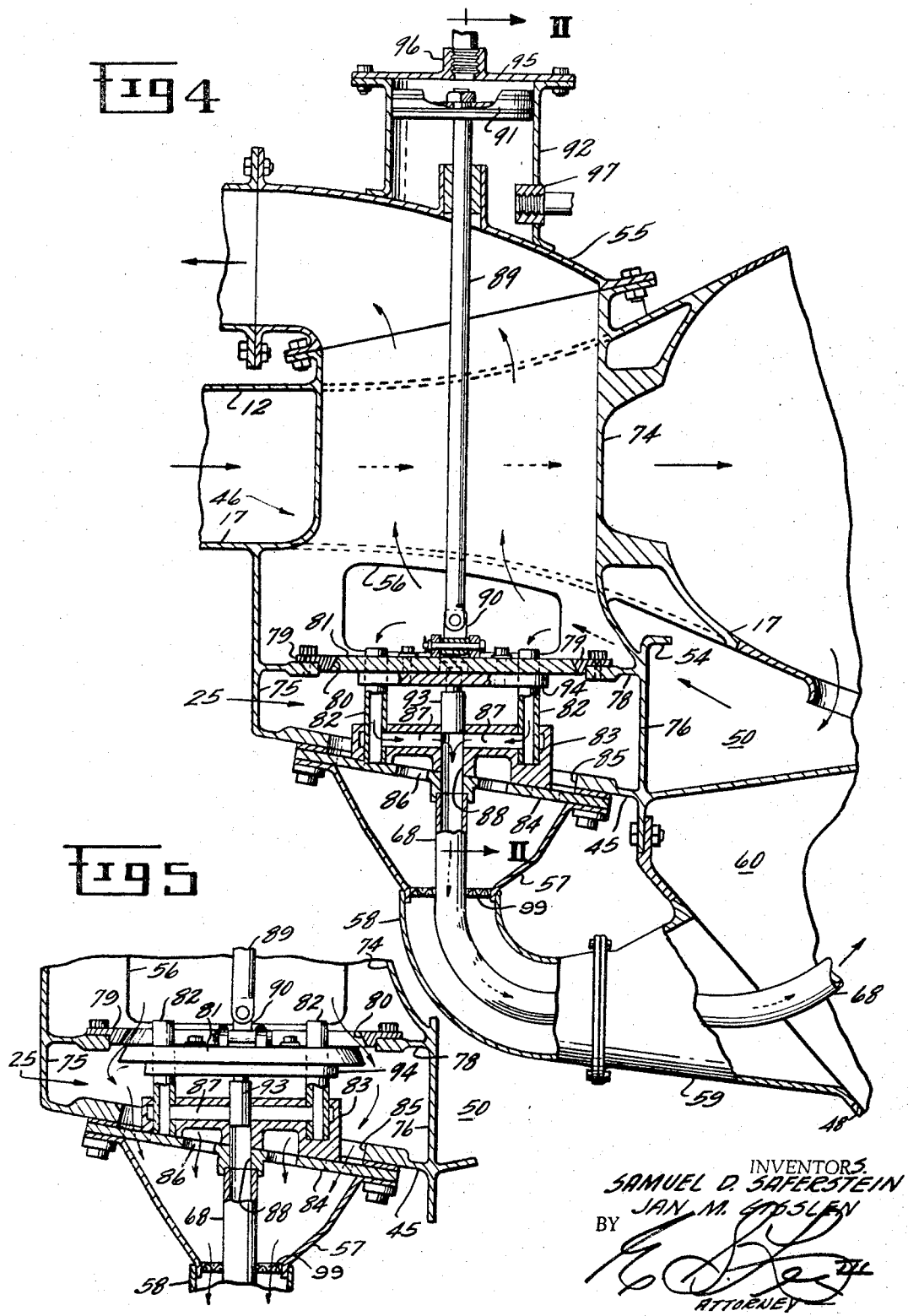

3,452,542
GAS TURBINE ENGINE COOLING SYSTEM
Samuel D. Saferstein and Jan M. Gisslen, Cincinnati, Ohio, assignors to General Electric Company, a corporation of New York
Filed Sept. 30, 1966, Ser. No. 583,179
Int. Cl. F02g 1/00; F01d 5/08
U.S. Cl. 60—39.66                    7 Claims The invention described and claimed in the United States Patent Application herein resulted from work done under United Sates Government contract FA–SS–64–1. The United States Government has an irrevocable, nonexclusive license under said application to practice and have practiced the invention claimed herein, including the unlimited right to sublicense others to practice and have practiced the claimed invention for any purpose whatsoever.

The present invention relates to a gas turbine engine cooling system and more particularly to a system and a valve for use in cooling turbine blades of turbine rotors incorporated in such an engine.

The quest for increased gas turbine engine preformance has resulted in the turbine blades, commonly used in such an engine, to be subjected to extremely high temperatures.

In order to reduce the temperatures of the turbine blades to levels within the blade material limitations, it has been common practice to provide a flow of relatively cool air, e.g., from the primary air flow engine compressor, through the blades. This air is passed to the blades through openings in a face of the rotor that is exposed to a cooling chamber pressurized by compressor discharge pressure. Since the cooling requirements of the blades generally vary with engine operating conditions, the flow of cooling air may be regulated to maintain the blade temperatures at acceptable levels and minimize the air extracted from the primary flow to improve engine efficiency.

However, in such an arrangement, when the cooling flow to the blades is shut off, the pressure in the cooling chamber is substantially reduced. This lowering of pressure reduces the axial loading on the turbine rotor and produces a substantial change in force on bearings used for journaling the rotor, thus impairing its operating life.

Accordingly, it is an object of the present invention to provide a simplified and highly effective means for eliminating axial force changes on the turbine rotor of a gas turbine engine when flow of cooling fluid to turbine rotor blades is regulated.

In one aspect, the above ends are achieved in a gas turbine engine having an annular gas stream. A rotating member including a turbine rotor having blades projecting into the gas stream is provided. The blades have passageways for cooling purposes, and the turbine rotor has a surface of substantial radial extent other than on the bladed portion thereof. First and second chambers are provided, the chambers comprising generally annular wall members and the radial surface of the turbine rotor. Passageway means are provided for defining a flow path from the first chamber to the turbine blade passageways.

Valve means are provided for directing relatively cool pressurized gas to the first chamber for passage of gas to cool the turbine blades while permitting said second chamber to remain at relatively low pressure. The valve means is provided for directing the same gas to the second chamber while permitting the first chamber to remain at a relatively low pressure and substantially terminate flow of gas to the turbine blades. As a result the axial force exerted on the rotor by the pressurized gas in the chambers is substantially constant when flow of gas to said turbine blades is initiated and terminated.

A further object of the invention is to provide an improved and highly effective valve means for selectively directing fluid into separate flow paths.

The above ends are achieved by providing a valve assembly comprising a housing having an opening forming an inlet for pressurized fluid. A wall is disposed in the housing and has one side thereof exposed to said inlet. The housing has a pair of openings on the opposite side of the wall forming outlets. The wall has a generally rectangular opening therethrough, the edges of which form a valve seat.

A valve element plate is adapted to be received in the valve seat for blocking flow of fluid through said opening, the valve being displaceable away from the seat for permitting flow of fluid through the opening. A pair of tubes disposed in the housing and extending through the valve plate to form a guide therefor. Passageway means are provided for defining a flow path from the tubes to one of the openings. A plunger extending from the valve plate is provided, and the plunger is adapted to be displaced with the valve plate and block flow of fluid through the passageway means when the valve plate is displaced to an open position wherein fluid flows through the other of said outlets, whereby the valve assembly selectively directs flow of fluid to said outlets.

The above and other related objects and features of the invention will be apparent from a reading of the following description of the disclosure found in the accompanying drawing and the novelty thereof pointed out in the appended claims.

In the drawings:

FIGURE 1 is a simplified showing of a gas turbine engine embodying the present invention;

FIGURE 2 is a view taken on line II—II of FIGURE 4;

FIGURE 3 is a view taken on line III—III of FIGURE 2;

FIGURE 4 is a longitudinal section view of a valve shown in FIGURE 1; and

FIGURE 5 is a fragmentary view of FIGURE 4 showing the valve in one of its positions.

FIGURE 1 illustrates, in a simplified fashion, portions of a gas turbine engine 10 having an outer casing 12 in which air is pressurized by a compressor 14 for delivery to a combustor 16. Fuel is injected into the combustor 16 through nozzles 19 (only one of which is shown), and the resultant fuel/air mixture is ignited to generate a hot gas stream. The hot gas stream from the combustor 16 passes through a turbine inlet nozzle 21 to a turbine 20 and finally through an engine exhaust nozzle (not shown) to provide a propulsive force for the engine 10.

The annular flow path for the gas stream through the compressor 14 is defined at its inner bounds by a series of interconnected discs 24 having circumferentially mounted blades 22 extending into the gas stream. The outer bounds are defined by the engine casing 12 which has circumferentially mounted stator vanes 26 extending into the gas stream.

The annular flow path through the turbine 20 is defined by a pair of discs 30, interconnected by a heat shield 31 and an annular torque member 32. Circumferentially mounted turbine blades 28 extend from the discs 30 into the gas stream. The flow path is further defined by an annular duct 36, which is mounted to the engine casing 12 at a flange 38.

A generally annular duct 17, mounted on a compressor discharge nozzle 23, engages the rearward disc 24 of the compressor 14 at a seal 15 to form, in combination with the engine casing 12, an annular discharge flow path from the compressor 14. An annular duct 18 extends from the duct 17 to the turbine inlet nozzle 21 to form a passageway for cooling air around the combustor 16.

The discs 24 and 30 are interconnected by opposing conical rotor elements 40, 42 and a tubular shaft 44 to form an engine rotor. The engine rotor is journaled for rotation by means including a thrust bearing 43 which is secured to a frame member comprising channel-shaped ring 45 and a structural cone 48. The channel-shaped ring forms a base for a plurality of radial struts 46 which extend to the engine casing 12. The bearing 43 may be lubricated in the usual fashion.

A portion of the discharge air from the compressor 14 is used for cooling the turbine blades 28 and other purposes. In this connection it should be noted that a relatively large opening 49 is provided in the duct 17 for passage of air into a plenum chamber 50 defined in part by an annular wall element 52 extending from the base of the channel-shaped ring 45 to the duct 17. The air then passes around a flange 54 of the ring 45 and passes to the interior of several hollow struts 46 through openings 56.

A portion of the air may be directed to the exterior of the engine for auxiliary pressurization purposes through conduits 55 connected to the outer ends of the struts 46.

A valve assembly 25, to be later described, is disposed in the base of selected strut 46 for regulating flow of cooling air into conduit elements 57, 58, 59 which are open to a turbine cooling chamber 60. The turbine cooling air chamber 60 is defined in part by a conical wall element 62 extending from duct 17 and engaging the rotor element 42 at a seal 63. A second conical wall element 64 extends from the conical support member 48 and engages the tubular shaft 44 at a seal 65. Relatively large openings 61 are provided in the rotor element 42 to permit flow of cooling air to the interior of the turbine rotor. The turbine rotor is sealed by a tubular duct element 66 so that all the cooling air passes through openings 67 in the torque member 32 and through suitable cooling passages in the turbine blades 28.

The valve assembly 25 is adapted to regulate flow of cooling air to the turbine blades 28 as a function of a suitable engine operating parameter, e.g., rotor speed, turbine inlet temperature, to minimize the cooling air extracted from the annular flow of gas through the engine 10 and thus improve its efficiency.

An alternate flow path for the compressor discharge air is provided by the valve assembly 25 when flow of cooling air to the turbine blades 28 is shut off. In this connection, it should be noted that a conduit 68 extends from the valve assembly 25 through the conical wall element 62 to a rotor balance chamber 70, defined in part by a conical wall element 71 extending from the duct 18 and engaging the rotor element 42 at a seal 72. The conical wall element 71 on its rearward side defines a turbine inlet chamber 73, which is open to the annular gas stream flowing through the turbine 20.

When the valve assembly 25 permits flow of air to the turbine blades 28, a portion of the air from chamber 60 passes across seal 65 to a recoup chamber 69, where the leakage air is ducted through a portion of the struts 46 to a suitable downstream point in the annular gas flow path. Another portion of the air passes across seal 63, through chamber 70 and across seal 72 into chamber 73. Thus, the pressure of the air in chamber 60 approaches that of the compressor discharge air, the gas in chamber 73 is that of turbine inlet gas stream, and the pressure in chamber 70 is at an intermediate level. The action of these pressures on the radially extending portions of the engine rotor produce a resultant axial force in an aft direction.

When the cooling flow to the blades 28 is shut off, the pressure in chamber 60 drops to a relatively low level, which tends to reduce the aft loading on the engine rotor. In order to maintain the aft loading on the engine level substantially constant when cooling flow is shut off, the valve 25 is adapted to selectively direct compressor discharge air to the chamber 70. When this happens, the pressure in chamber 70 approaches compressor discharge pressure and chamber 60 is pressurized by leakage from chamber 70 to a level intermediate the pressure in chamber 70 and the pressure in the recoup chamber 69. The chamber 73 remains at turbine inlet pressure. The radial areas of the engine rotor which are exposed to the pressures in chambers 60 and 70 are selected by positioning seals 63 and 72 so that the axial loading on the engine rotor is substantially unaffected by shutting off flow of cooling air to the turbine.

Reference is now had to FIGURES 2 and 4 which show, in detail, the valve assembly 25 positioned in the base of the illustrated radial strut 46. The strut 46 comprises a hollow airfoil portion 74 extending radially across the annual gas flow path and secured to the engine casing 12 and the duct 17. The base of the airfoil portion 74 flares into side walls 75, 76 of the channel-shaped ring 45. A pair of longitudinal ribs 77, 98 extend between the side walls 75 and 76 and the base of the ring 45 to form a rectangular base for the struts 46.

A wall 78, integrally formed in the rectangular base of the strut 48, provides a support for a generally rectangular plate 79 which is secured thereto by screws. The plate 79 has a generally oval opening 80 with beveled edges to form a valve seat. An oval valve plate 81 fits into the valve seat 80 and has beveled edges for engaging the valve seat. A pair of tubes 82 (FIGURES 3 and 4) fitted into a casting 83 form guides for the valve plate 81. The casting 83 is welded to a plate 84 which is sandwiched between the bottom of the channel-shaped ring 45 and the duct element 57.

The casting 83 has passageways 87, 88 therein which provide a flow path from the tubes 82 to the conduit 68 which extends to the rotor balance chamber 70. A plunger 93, which is slidable in passageway 88, extends from a plate 94 to the valve plate 81 as by screws.

The valve plate 81 is actuated by a piston rod 89 secured thereto by a universal joint 90. A piston 91 is bolted on the end of the piston rod 89 and is adapted to reciprocate in a cylinder 92 welded to the duct 55 of the strut 46. A cap 95 is bolted to the outer end of the cylinder 92. Hydraulic fluid is introduced to the cylinder 92 through a pair of fittings 96, 97 to displace the piston 91 and move the valve plate 81 between its closed and open positions. Flow of hydraulic fluid can be controlled manually or automatically by any suitable means.

When it is desired to initiate cooling flow to the turbine blades 28, the piston 91 is actuated and the valve plate 81 is displaced to its open position wherein cooling air flows through the valve seat plate 79 and through openings 86 in the plate 84 to the turbine cooling chamber 60. A screen or filter 99 is provided in the conduit element 57 to block flow of foreign objects to the turbine cooling chamber 60. At the same time, the plunger 93 is displaced through passageway 87 to block flow of air to the turbine rotor balance chamber 70.

When the flow of cooling air to the turbine cooling chamber 60 is terminated by displacing the valve plate 81 to its closed position, the plunger 93 is simultaneously displaced out of the passageway 88 to provide the flow path from the interior of the strut 46 to the turbine balance chamber 70. Thus, as the turbine cooling air flow is shut off, the turbine balance air flow is started to achieve a relatively constant axial force on the engine rotor.

When it is desired to gain access to the valve assembly 25 for inspection or replacement without major disassembly of the engine, the following procedure is used. The cap 95 is removed from the cylinder 92 and the piston 91 removed from the piston rod 89. The duct 55 is then removed from the engine casing 12.

The screws that hold the valve seat plate 79 to the platform 78 are removed, which permits the plate 70 to be rotated and tilted for removal through the streamlined portion 74 of the strut by a suitable tool. The valve plate 81 is then detached from the plate 94. The valve plate 81 is pulled radially outward beyond the tubular guide pins 82. The universal joint 90 allows the valve plate 81 to be twisted and tilted for removal through the strut 74 because the plate 81 is wider than the streamlined portions 74 of the struts, as shown in FIGURE 3. The valve assembly 58 is installed in reverse order.

The invention thus described provides a highly effective means for maintaining relatively constant axial force on the rotor of a gas turbine engine when cooling air for turbine blades is provided during a portion of the engine operating regime. Furthermore, the valve assembly described provides an effective means of selectively regulating flow to two flow paths and is replaced without major disassembly of the engine.

Having thus described the invention, what is claimed as novel and desired to be secured by Letters Patent of the United States is:

1. In a gas turbine engine having an annular gas stream,
   a rotating member including a turbine rotor having blades projecting into said gas stream, said blades having passageways for cooling purposes,
   said turbine rotor having a surface of substantial radial extent other than on the bladed portion thereof,
   first and second concentric chambers comprising generally annular wall members and the radial surface of said turbine rotor,
   passageway means for providing a flow path from said first chamber to said turbine blade passageways,
   valve means for directing relatively cool pressurized gas to said first chamber for passage of gas to cool said turbine blades while permitting said second chamber to remain at a relatively low pressure and for directing the same gas to said second chamber while permitting said first chamber to remain at a relatively low pressure and substantially terminate flow of gas to said turbine blades,
   whereby the axial force on said rotor exerted by the pressurized gas in said chambers is substantially constant when flow of gas to said turbine blades is initiated and terminated.

2. Apparatus as in claim 1 wherein,
   said rotating member further includes a compressor rotor having blades extending into said gas stream and a relatively small diameter shaft interconnecting said turbine rotor with said compressor rotor,
   said valve means is adapted to direct to said chambers a portion of the gas stream from said compressor rotor.

3. Apparatus as in claim 2 wherein,
   said turbine rotor passageway means comprises,
   an opening in said rotor for exposing the interior of said rotor to said chamber,
   means for providing a chamber in the interior of said rotor through which said gas from said first chamber passes to the passageways in said turbine blades.

4. Apparatus as in claim 2 further comprising,
   means for providing a flow path from the annular gas stream downstream of said compressor rotor to said first and second chambers,
   said valve means being disposed in said flow path and displaceable between two positions one of which permits flow of pressurized gas to said first chamber and the other permitting flow of pressurized gas to said second chamber.

5. Apparatus as in claim 4 wherein,
   said means for providing a flow path comprises,
   generally concentric annular duct walls forming a discharge flow path from said compressor rotor,
   at least one hollow strut extending radially inward through said discharge duct,
   said strut having an opening radially inward of said duct and the inner concentric duct having an opening downstream of said strut for permitting flow of gas to the interior of said strut,
   said strut having a pair of conduits extending from its radially inward end extending to the first and second chambers respectively.

6. Apparatus as in claim 5 wherein said valve means comprises,
   wall means disposed in the interior of said strut and extending from wall to wall of said strut,
   said wall means having an opening with a beveled edge for forming a valve seat,
   a valve plate conforming to the contour of said opening and displaceable radially inward to an open position,
   a pair of tubes mounted in the base of said hollow strut and extending through said valve plate means for forming guides,
   passageway means for forming a flow path from said tubes to the conduit extending to said second chamber,
   means responsive to the displacement of said valve plate means to an open position for blocking the flow path to said balance chamber,
   means for displacing said valve plate means between an open and closed position.

7. Apparatus as in claim 6 wherein,
   said wall means comprises a platform secured to the walls of said strut and a valve seat plate detachably secured to said platform,
   said flow blocking means comprises a plunger detachably secured to said valve plate and displaceable into flow path to said balance chamber,
   said valve plate displacing means comprises a rod extending radially outward through said strut and secured to said valve plate by a universal joint,
   whereby when said valve seat plate and said plunger are detached, said valve plate may be removed radially outward through said strut.

References Cited
UNITED STATES PATENTS

| | | | |
|---|---|---|---|
| 2,791,091 | 5/1957 | Wheatley et al. | 60—39.66 |
| 2,811,833 | 11/1957 | Broffitt | 60—39.66 |
| 2,940,258 | 6/1960 | Lombard et al. | 60—39.66 |
| 2,951,340 | 9/1960 | Howard | 60—39.66 |

SAMUEL FEINBERG, *Primary Examiner.*

U.S. Cl. X.R.

253—39I5, 69